United States Patent
Yamauchi

(10) Patent No.: US 12,141,912 B2
(45) Date of Patent: Nov. 12, 2024

(54) PROJECTION METHOD AND PROJECTION SYSTEM

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 127 days.

(21) Appl. No.: 17/948,820

(22) Filed: Sep. 20, 2022

(65) Prior Publication Data

US 2023/0092033 A1 Mar. 23, 2023

(30) Foreign Application Priority Data

Sep. 21, 2021 (JP) ................................. 2021-152923

(51) Int. Cl.
*G06T 15/20* (2011.01)
*G06T 7/73* (2017.01)

(52) U.S. Cl.
CPC ................ *G06T 15/20* (2013.01); *G06T 7/73* (2017.01); *G06T 2207/30204* (2013.01)

(58) Field of Classification Search
CPC ........................................................ G06T 3/08
See application file for complete search history.

(56) References Cited

U.S. PATENT DOCUMENTS

| 9,304,582 B1* | 4/2016 | Kamarshi | G06T 7/73 |
| 2010/0066865 A1* | 3/2010 | Sakamoto | H04N 5/2628 |
| | | | 348/240.99 |
| 2012/0281092 A1* | 11/2012 | Olivier | H04L 67/12 |
| | | | 348/148 |
| 2019/0199983 A1 | 6/2019 | Suzuki et al. | |

(Continued)

FOREIGN PATENT DOCUMENTS

| JP | 2018-097148 A | 6/2018 |
| JP | 2019-113705 A | 7/2019 |

(Continued)

OTHER PUBLICATIONS

"Vuforia Chalk: Remote Assistance Powered By Augmented Reality". <URL: https://www.ptc.com/en/products/vuforia/vuforia-chalk>.

(Continued)

*Primary Examiner* — Ryan McCulley
(74) *Attorney, Agent, or Firm* — Oliff PLC

(57) ABSTRACT

A projection method includes, obtaining a first image obtained by imaging a projection target with a camera, receiving an operation of a user drawing a drawing object in the first image, generating first object information representing a two-dimensional position of the drawing object in the first image, converting the first object information into second object information, converting the second object information into third object information representing a position of the drawing object on an image to be projected from a projector based on second position information (Continued)

representing a relative three-dimensional position between the projector and the projection target and second posture information representing an orientation of an optical axis of the projector, and projecting a projection image including the drawing object on the projection target from the projector.

6 Claims, 10 Drawing Sheets

(56) References Cited

U.S. PATENT DOCUMENTS

| | | |
|---|---|---|
| 2020/0099906 A1 | 3/2020 | Sugisawa et al. |
| 2021/0160469 A1 | 5/2021 | Sakai |
| 2021/0306389 A1* | 9/2021 | Kulbida ............... H04L 65/4015 |
| 2023/0247184 A1* | 8/2023 | Mashitani ............... G03B 21/26 |
| | | 348/744 |

FOREIGN PATENT DOCUMENTS

| | | |
|---|---|---|
| JP | 2021-086478 A | 6/2021 |
| JP | 2021-087043 A | 6/2021 |

OTHER PUBLICATIONS

"Dynamics 365 Remote Assist". Microsoft, <URL: https://dynamics.microsoft.com/en-us/mixed-reality/remote-assist/>.

"Introducing Dynamics 365 Remote Assist for Hololens 2 And Mobile Devices". YouTube, Microsoft, Apr. 2, 2020.

* cited by examiner

PROJECTION METHOD AND PROJECTION SYSTEM

The present application is based on, and claims priority from JP Application Serial Number 2021-152923, filed Sep. 21, 2021, the disclosure of which is hereby incorporated by reference herein in its entirety.

BACKGROUND

1. Technical Field

The present disclosure relates to a projection method and a projection system.

2. Related Art

There is spreading projection mapping in which a projection image is projected from a projector on a projection target having a three-dimensional shape to thereby perform a variety of renderings. Further, there are proposed a variety of technologies for generating the projection image for the projection mapping, and there can be cited, as an example, a technology disclosed in JP-A-2018-97148 (Document 1) or JP-A-2021-87043 (Document 2). In Document 1, there is disclosed a technology of analyzing a taken image of the projection target by a camera to thereby identify an area occupied by the projection target, and then generating the projection image based on the identification result. In Document 2, there is disclosed a technology of displaying the taken image of the projection target by the camera as a background in a display area in a terminal such as a smartphone, and making the projector project an image of an object drawn in the display area.

In the technology disclosed in Document 1, although a conversion table between a camera coordinate system and a projector coordinate system is generated, the conversion table is a correspondence relation between the projection image and the taken image. Therefore, when an object position moves after executing a calibration, the correspondence relation changes from one at the calibration, and therefore, it is unachievable to perform drawing at a desired three-dimensional position. Further, in the technology disclosed in Document 2, the correspondence relation is obtained by a keystone correction on the projection area in the camera image as the correspondence relation of the projector image in the camera image. However, since depth information existing in the projection area is not considered in the keystone correction, when the projection target has the three-dimensional shape, it is unachievable to perform the drawing at the desired three-dimensional position in the projection target. Further, similarly to Document 1, when the object position moves from one in the state in which the correspondence relation between the camera and the projector is made, it is unachievable to perform the drawing at the desired three-dimensional position. In other words, in the technologies disclosed in Document 1 and Document 2, there is a problem that the drawing object drawn by the user on the image of the projection target cannot accurately be projected in some cases at the position where the drawing object is drawn and with the shape of the drawing object thus drawn.

SUMMARY

A projection method according to an aspect of the present disclosure includes obtaining a first image obtained by imaging a projection target with a camera, receiving an operation of a user drawing a drawing object in the first image to thereby generate first object information representing a two-dimensional position of the drawing object in the first image, converting the first object information into second object information representing a three-dimensional position of the drawing object when the drawing object is arranged on a surface of the projection target based on first position information representing a relative three-dimensional position between the camera and the projection target and first posture information representing an orientation of an optical axis of the camera, and converting the second object information into third object information representing a two-dimensional position of the drawing object on an image to be projected from a projector based on second position information representing a relative three-dimensional position between the projector and the projection target and second posture information representing an orientation of an optical axis of the projector to thereby project a projection image including the drawing object on the projection target from the projector.

Further, a projection method according to another aspect of the present disclosure includes obtaining a first image obtained by viewing a virtual object from a viewpoint set by a user in a virtual space which includes the virtual object simulating a projection target and a virtual projector simulating a projector configured to project an image on the projection target, and in which a relative three-dimensional position between the virtual object and the virtual projector is decided in accordance with a relative three-dimensional position between the projection target and the projector, receiving an operation of the user drawing a drawing object in the first image to thereby generate first object information representing a two-dimensional position of the drawing object in the first image, converting the first object information into second object information representing a three-dimensional position of the drawing object arranged on a surface of the projection target when the drawing object is arranged on a surface of the virtual object based on first position information representing a relative three-dimensional position between the viewpoint and the virtual object, and converting the second object information into third object information representing a two-dimensional position of the drawing object on an image to be projected from the virtual projector based on second position information representing a relative three-dimensional position between the virtual projector and the virtual object and posture information representing an orientation of an optical axis of the virtual projector to thereby project a projection image including the drawing object on the projection target from the projector.

Further, a projection system according to another aspect of the present disclosure includes a projector configured to project an image on a projection target, an input device configured to receive an operation of a user, and a processing device. The processing device is configured to execute obtaining a first image obtained by imaging the projection target with a camera, receiving, by the input device, an operation of drawing a drawing object in the first image to thereby generate first object information representing a two-dimensional position of the drawing object in the first image, converting the first object information into second object information representing a three-dimensional position of the drawing object when the drawing object is arranged on a surface of the projection target based on first position information representing a relative three-dimensional position between the camera and the projection target and first posture information representing an orientation of an optical axis of the camera, and converting the second object information into third object information representing a two-dimensional position of the drawing object on an image to be projected from the projector based on second position information representing a relative three-dimensional position between the projector and the projection target and second posture information representing an orientation of an optical axis of the projector to thereby project a projection image including the drawing object on the projection target from the projector.

Further, a projection system according to another aspect of the present disclosure includes a projector configured to project an image on a projection target, an input device configured to receive an operation of a user, and a processing device. The processing device is configured to execute obtaining a first image obtained by viewing a virtual object from a viewpoint set by an operation to the input device in a virtual space which includes the virtual object simulating the projection target and a virtual projector simulating the projector, and in which a relative three-dimensional position between the virtual object and the virtual projector is decided in accordance with a relative three-dimensional position between the projection target and the projector, receiving, by the input device, an operation of drawing a drawing object in the first image to thereby generate first object information representing a two-dimensional position of the drawing object in the first image, converting the first object information into second object information representing a three-dimensional position of the drawing object arranged on a surface of the projection target when the drawing object is arranged on a surface of the virtual object based on first position information representing a relative three-dimensional position between the viewpoint and the virtual object, and converting the second object information into third object information representing a two-dimensional position of the drawing object on an image to be projected from the virtual projector based on second position information representing a relative three-dimensional position between the virtual projector and the virtual object and posture information representing an orientation of an optical axis of the virtual projector to thereby project a projection image including the drawing object on the projection target from the projector.

DESCRIPTION OF EXEMPLARY EMBODIMENTS

Some embodiments of the present disclosure will hereinafter be described with reference to the drawings. The embodiments described hereinafter are provided with a variety of technically preferable limitations. However, the embodiments of the present disclosure are not limited to aspects described below.

1. First Embodiment

Figure 1:
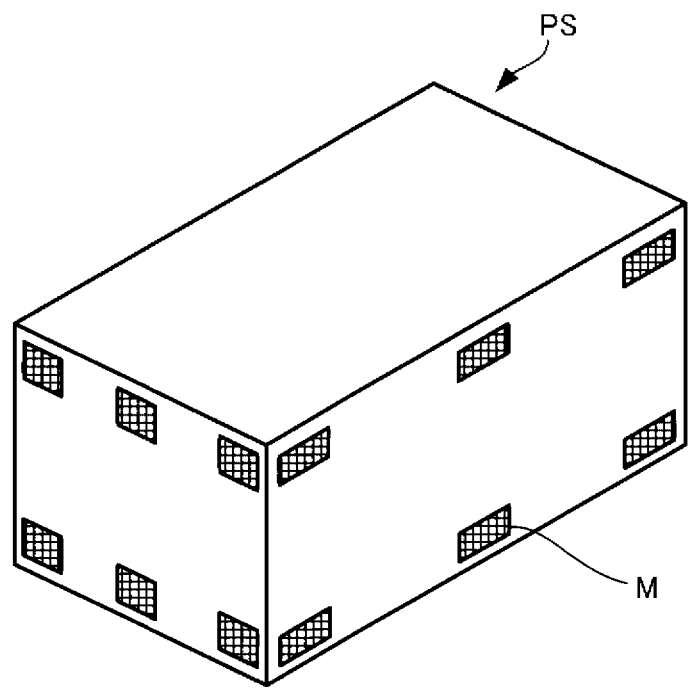
FIG. 1 is a diagram showing a configuration example of a projection system according to a first embodiment of the present disclosure.
Figure 1:
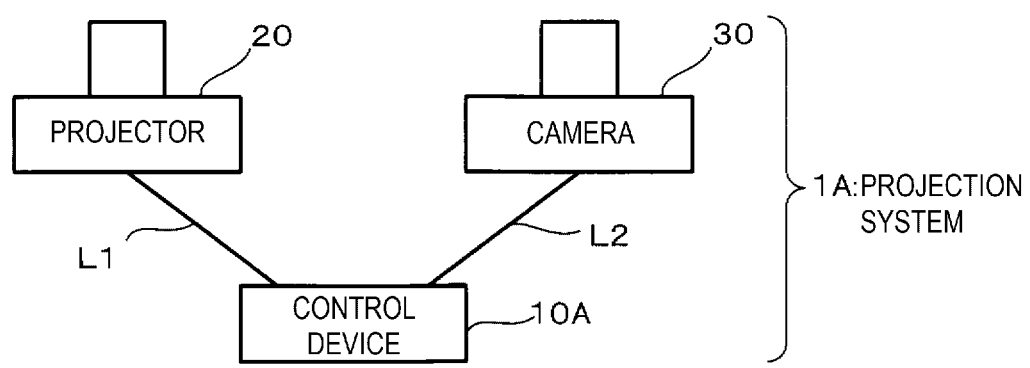

FIG. 1 is a diagram showing a configuration example of a projection system 1A according to a first embodiment of the present disclosure. As shown in FIG. 1, the projection system 1A includes a control device 10A, a projector 20 for projecting a projection image on a projection target PS, and a camera 30 for taking an image of the projection target PS. The projection target PS is an object having a three-dimensional shape. As shown in FIG. 1, the projection target PS in the present embodiment is an object having a rectangular solid shape.

As shown in FIG. 1, the projector 20 is coupled to the control device 10A via a communication line L1 such as a USB (Universal Serial Bus) cable. Similarly, the camera 30 is coupled to the control device 10A via a communication line L2 such as a USB cable. The control device 10A communicates with the camera 30 via the communication line L2 to thereby obtain taken image data representing the taken image of the projection target PS from the camera 30. The taken image of the projection target PS by the camera 30 is an example of a first image in the present disclosure. It should be noted that the communication between the control device 10A and the camera 30 can be wireless communication. Similarly, the communication between the control device 10A and the projector 20 can also be wireless communication.

The control device 10A receives an operation by the user of drawing a drawing object to be projected on the projection target PS in an area represented by the projection object PS in the taken image of the projection target PS. The control device 10A generates projection image data which represents the projection image to be projected on the projection target PS from the projector 20 in accordance with that operation. The control device 10A transmits the projection image data thus generated to the projector 20 via the communication line L1. In the projection system 1A, by projecting the projection image represented by the projection image data from the projector 20 on the projection target PS, projection mapping is realized. The control device 10A conspicuously showing features of the present embodiment will hereinafter be described with a focus on the control device 10A.

Figure 2:
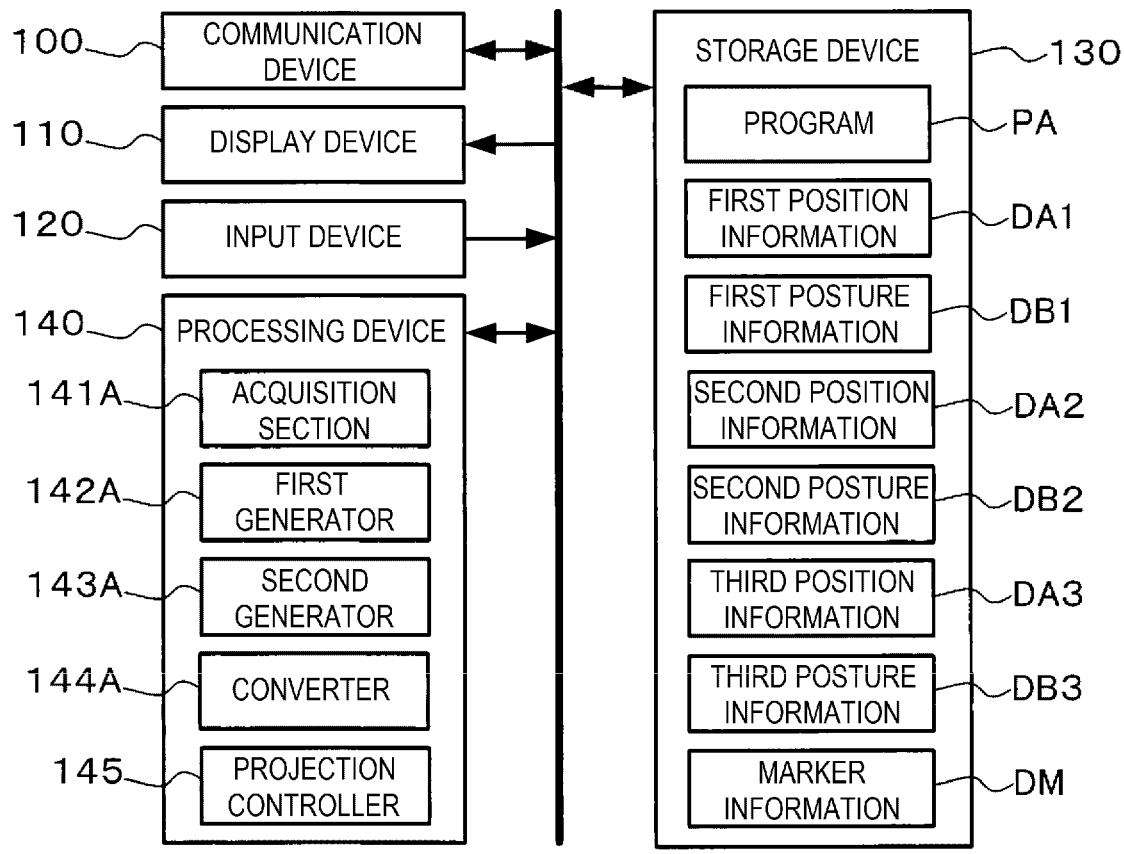
FIG. 2 is a diagram showing a configuration example of a control device included in the projection system.

FIG. 2 is a block diagram showing an example of a hardware configuration of the control device 10A. As shown in FIG. 2, the control device 10A includes a communication device 100, a display device 110, an input device 120, a storage device 130, and a processing device 140. As a specific example of the control device 10A, there can be cited a mobile terminal such a smartphone or a tablet terminal.

To the communication device 100, there are coupled the communication line L1 and the communication line L2. The communication device 100 receives the taken image data transmitted from the camera 30 via the communication line L2. The communication device 100 outputs the taken image data thus received to the processing device 140. Further, the communication device 100 transmits the projection image data provided from the processing device 140 to the projector 20 via the communication line L1. As a specific example of the communication device 100, there can be cited an interface circuit.

The display device 110 is a device for displaying an image under the control by the processing device 140. As a specific example of the display device 110, there can be cited a liquid crystal display and a drive circuit for the liquid crystal display. As an example of the image to be displayed by the display device 110, there can be cited an image represented by the taken image data, namely the taken image of the projection target PS by the camera 30.

The input device 120 is a device for receiving an operation by the user of the projection system 1A. As a specific example of the input device 120, there can be cited a pressure sensor which is shaped like a transparent sheet, and which is arranged so as to cover a display area of the display device 110. In the present embodiment, the pressure sensor is used as the input device 120, and a touch panel is constituted by the display device 110 and the input device 120. Under the condition in which the taken image of the projection target PS is displayed on the display device 110, the user of the projection system 1A can perform an operation of drawing a drawing object to be projected on the projection target PS in an area occupied by the projection target PS in the taken image, on the input device 120. The input device 120 provides the processing device 140 with operation content data representing the operation of the user performed to the input device 120. By the operation content data being provided to the processing device 140 from the input device 120, the content of the operation by the user is transmitted to the processing device 140.

The storage device 130 includes a RAM (Random Access Memory) as a volatile storage device and a ROM (Read Only Memory) as a nonvolatile storage device. In the nonvolatile storage device, there is stored a program PA for making the processing device 140 execute a projection method conspicuously representing the features of the present disclosure. The volatile storage device is used by the processing device 140 as a work area when executing the program PA. Further, in the volatile storage device of the storage device 130, there are stored first position information DA1, first posture information DB1, second position information DA2, second posture information DB2, third position information DA3, third posture information DB3, and marker information DM.

In the present embodiment, on a surface of the projection target PS, there is provided in advance a plurality of markers M as shown in FIG. 1. These markers M are AR (Augmented Reality) markers different from each other. Regarding these markers M, there are measured in advance three-dimensional positions in a three-dimensional space in which the projection target PS, the projector 20, and the camera 30 are arranged. The three-dimensional space in which the projection target PS, the projector 20, and the camera 30 are arranged is hereinafter referred to as a real space. When measuring the three-dimensional positions of the markers M in the real space, there is set an arbitrary three-dimensional coordinate system. This three-dimensional coordinate system is referred to as a real space coordinate system. In the present embodiment, the three-dimensional coordinate value in the real space coordinate system of each of the plurality of markers M is known. The marker information DM is information representing the three-dimensional positions of the respective markers M in the real space coordinate system. The marker information DM is stored in advance in the storage device 130.

The third position information DA3 is information representing a three-dimensional position of the camera 30 viewed from the projector 20 in the real space coordinate system, namely a relative three-dimensional position between the projector 20 and the camera 30 in the real space coordinate system. In the present embodiment, a position of a principal point of an imaging lens of the camera 30 in the real space coordinate system is used as the three-dimensional position of the camera 30 in the real space coordinate system. Further, in the present embodiment, a position of a principal point of a projection lens of the projector 20 in the real space coordinate system is used as the three-dimensional position of the projector 20 in the real space coordinate system. The third position information DA3 in the present embodiment corresponds to a parallel translation matrix used when moving the principal point of the imaging lens of the camera 30 to the principal point of the projection lens of the projector 20 using the parallel translation in the real space coordinate system. In the present embodiment, the relative three-dimensional position between the projector 20 and the camera 30 is fixed, and the third position information DA3 is stored in advance in the storage device 130.

A coordinate system having the principal point of the camera 30 as the origin, a coordinate axis along a horizontal scanning direction of the taken image by the camera 30 as the x axis, a coordinate axis along a vertical scanning direction of that taken image as the y axis, and a coordinate axis along an optical axis of the camera 30 as the z axis is hereinafter referred to as a camera coordinate system. Further, a coordinate system having the principal point of the projector 20 as the origin, a coordinate axis along a horizontal scanning direction of the projection image by the projector 20 as the x axis, a coordinate axis along a vertical scanning direction of that projection image as the y axis, and a coordinate axis along an optical axis of the projector 20 as the z axis is hereinafter referred to as a projector coordinate system.

The third posture information DB3 is information representing a relative posture of the camera 30 to the projector 20 in the real space coordinate system. The third posture information DB3 in the present embodiment is a rotation matrix which converts a unit vector along the optical axis of the projector 20 in the real space coordinate system into a unit vector along the optical axis of the camera 30 in the real space coordinate system using a rotation. In the present embodiment, the relative posture of the camera 30 to the projector 20 in the real space coordinate system is fixed, and the third posture information DB3 representing the relative posture between the camera 30 and the projector 20 is stored in advance in the storage device 130. The third position information DA3 and the third posture information DB3 are information for performing an interconversion between the camera coordinate system and the projector coordinate system.

The first position information DA1 is information representing a three-dimensional position of the projection target PS viewed from the camera 30 in the real space coordinate system, namely a relative three-dimensional position between the camera 30 and the projection target PS in the real space coordinate system. The first posture information DB1 is information representing a posture of the camera 30, namely an orientation of the optical axis of the camera 30, in the real space coordinate system. The first position information DA1 and the first posture information DB1 are generated in the following manner based on the principle of PnP (Perspective n-Points).

Figure 3:
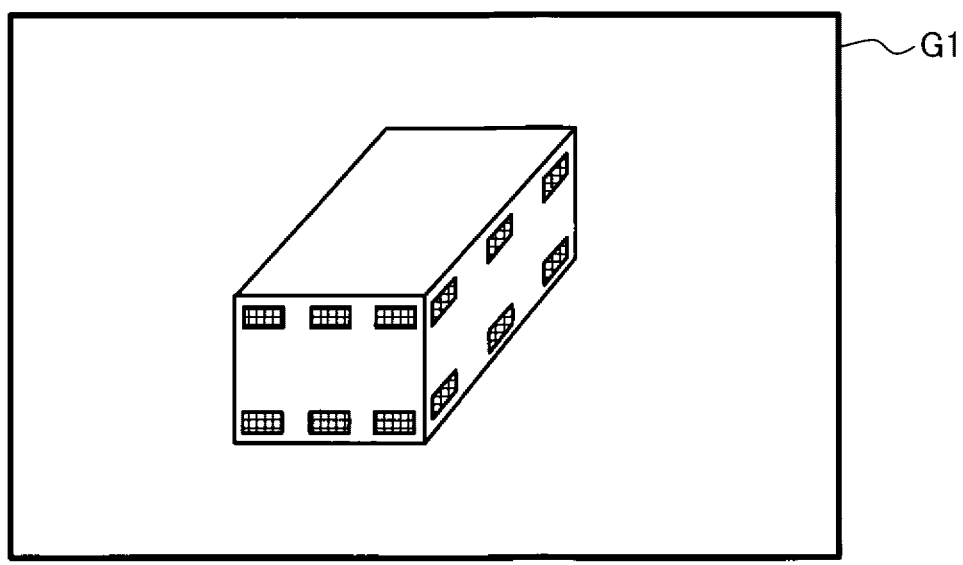
FIG. 3 is a diagram showing an example of a taken image of a projection target by a camera.
Figure 4:
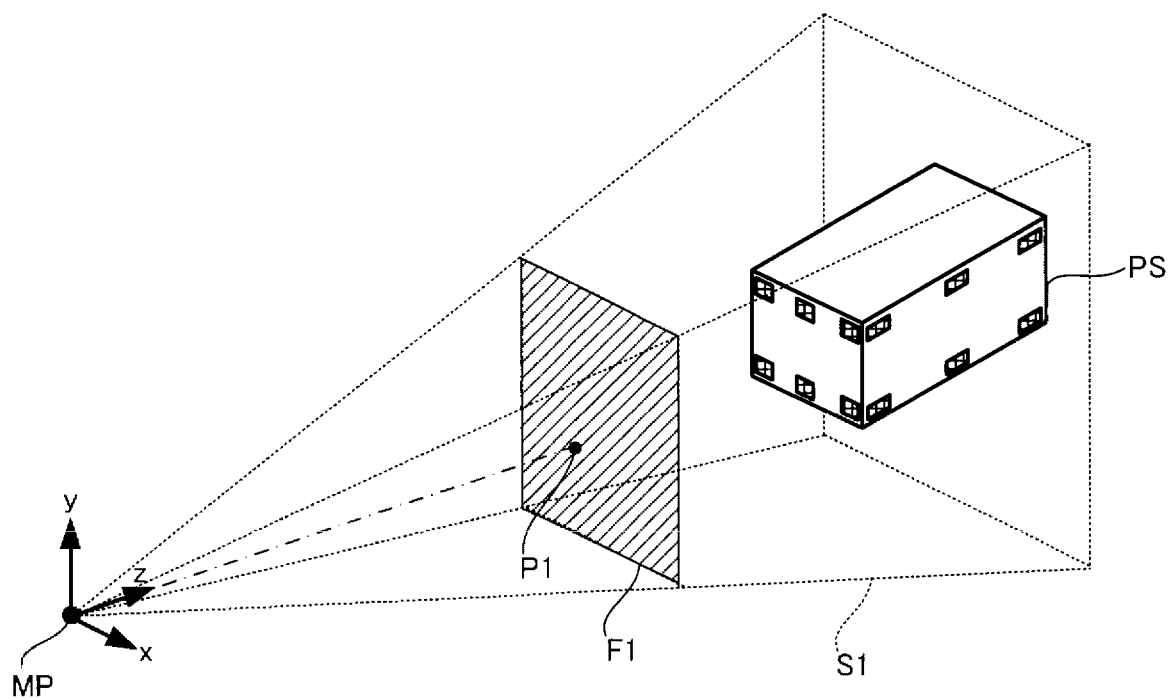
FIG. 4 is a diagram for explaining a principle of a calculation of first position information and first posture information.

FIG. 3 is a diagram showing an example of a taken image G1 by the camera 30. This taken image G1 corresponds to a front clipping plane F1 shown in FIG. 4. More specifically, by the front clipping plane F1 in a viewing frustum S1 a tip of which is located at the principal point MP of the camera 30 in the real space coordinate system, and which includes the projection target PS showing up on an imaging plane of the camera 30 via an imaging lens, the taken image G1 is obtained. The three-dimensional position of the marker M in the camera coordinate system is expressed as (mx,my,f) using a two-dimensional position (mx,my) of the marker M on the taken image G1 and a distance f from the principal point MP of the camera 30 to the front clipping plane F1.

As described above, since the three-dimensional position (X,Y,Z) in the real space coordinate system of the marker M is known, the three-dimensional position (X,Y,Z) in the real space coordinate system of the marker M and the three-dimensional position (mx,my,f) of the marker M in the camera coordinate system are associated with each other using an internal parameter matrix F expressed by a formula (2) and a matrix RT expressed by a formula (3) as expressed by a following formula (1). It should be noted that the reference symbol fx in the internal parameter matrix F represents a focal distance in a horizontal scanning direction out of focal distances in the imaging lens of the camera 30, and the reference symbol fy represents a focal distance in a vertical scanning direction out of the focal distances in the imaging lens. Further, the reference symbols cx and cy are an x coordinate and a y coordinate on the taken image G1 of an intersection point P1 between a straight line passing through the principal point MP of the camera 30 and extending along the z axis and the front clipping plane F1. It should be noted that the internal parameter matrix F is known, and information representing the internal parameter matrix F is stored in the storage device 130 in advance. Further, in the present embodiment, an internal parameter matrix of the projection lens of the projector 20 is also stored in the storage device 130 in advance.

$$f \begin{bmatrix} \frac{mx}{f} \\ \frac{my}{f} \\ 1 \end{bmatrix} = F \times RT \begin{bmatrix} X \\ Y \\ Z \\ 1 \end{bmatrix} \quad (1)$$

$$F = \begin{bmatrix} f_x & 0 & c_x \\ 0 & f_y & c_y \\ 0 & 0 & 1 \end{bmatrix} \quad (2)$$

$$RT = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \quad (3)$$

The matrix RT includes a 3×3 rotation matrix constituted by components r11 through r33, and a 3×1 parallel translation matrix constituted by components t1 through t3. In the present embodiment, this rotation matrix corresponds to the first posture information DB1, and this parallel translation matrix corresponds to the first position information DA1. In the present embodiment, since the twelve components constituting the matrix RT are unknown, the first posture information DB1 and the first position information DA1 can be obtained by solving the system of twelve equations obtained by substituting the three-dimensional positions (X,Y,Z) in the real space coordinate system and the two-dimensional positions (mx,my) on the taken image G1 with respect to at least six markers M into the formula (1).

The second position information DA2 is information representing a three-dimensional position of the projection target PS viewed from the projector 20 in the real space coordinate system, namely a relative three-dimensional position between the projector 20 and the projection target PS in the real space coordinate system. The second position information DA2 in the present embodiment is a parallel translation matrix similarly to the first position information DA1. The second posture information DB2 is information representing a posture of the projector 20, namely an orientation of the optical axis of the projector 20, in the real space coordinate system. The second posture information DB2 is a rotation matrix similarly to the first posture information DB1. In the present embodiment, since the relative three-dimensional position and the relative posture between the camera 30 and the projector 20 are fixed, the second position information DA2 is generated based on the first position information DA1 and the third position information DA3. Further, the second posture information DB2 is generated based on the first posture information DB1 and the third posture information DB3.

The processing device 140 includes a processor such as a CPU (Central Processing Unit), namely a computer. The processing device 140 can include a single processor, or can also include a plurality of processors. Taking power-on of the control device 10A as a trigger, the processing device 140 reads out the program PA from the nonvolatile storage device to the volatile storage device, and starts the execution of the program PA.

More specifically, the processing device 140 which is currently operating in accordance with the program PA functions as an acquisition section 141A, a first generator 142A, a second generator 143A, a converter 144A, and a projection controller 145. In other words, the acquisition section 141A, the first generator 142A, the second generator 143A, the converter 144A, and the projection controller 145 are software modules which are realized by making the computer operate with the program PA. The individual functions of the acquisition section 141A, the first generator 142A, the second generator 143A, the converter 144A, and the projection controller 145 are as follows.

The acquisition section 141A obtains the taken image obtained by taking an image of the projection target PS with the camera 30. Ina more detailed description, the acquisition section 141A communicates with the camera 30 using the communication device 100 to thereby obtain image data transmitted from the camera 30, namely taken image data representing the taken image of the projection target PS by the camera 30.

The first generator 142A generates the first position information DA1 and the first posture information DB1 using the principle of PnP based on the taken image represented by the taken image data obtained by the acquisition section 141A and the marker information DM. Further, the first generator 142A generates the second position information DA2 based on the first position information DA1 and the third position information DA3, and at the same time, generates the second posture information DB2 based on the first posture information DB1 and the third posture information DB3.

Figure 5:
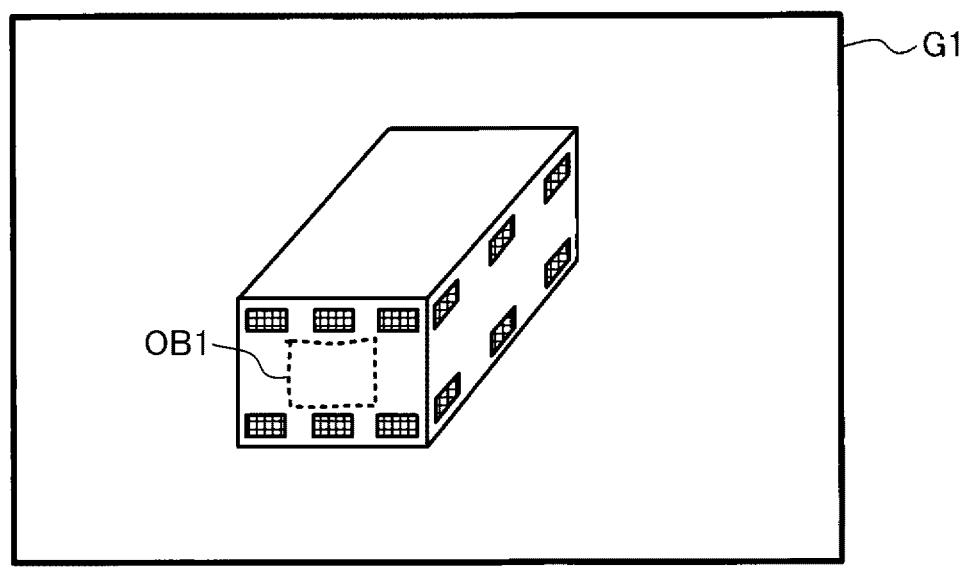
FIG. 5 is a diagram for explaining an operation example of the present embodiment.

The second generator 143A makes the display device 110 display an image represented by the taken image data obtained by the acquisition section 141A, namely the taken image of the projection target PS by the camera 30, to thereby receive an operation of drawing the drawing object in an area occupied by the projection target PS in the taken image. The second generator 143A receives operation content data output from the input device 120. The operation content data is data corresponding to an operation of performing drawing. The second generator 143A receives the operation content data to thereby receive the operation of drawing the drawing object. Based on the operation content data, the second generator 143A generates first object information representing a two-dimensional position of the drawing object in the taken image, specifically, two-dimensional positions of respective points on the drawing object. For example, it is assumed that an operation of drawing the drawing object OB1 represented by dotted lines in FIG. 5 is made on the input device 120 under the condition that the taken image G1 shown in FIG. 3 is displayed on the display device 110. In this case, the second generator 143A generates the first object information representing the respective two-dimensional positions of the plurality of points located on the lines represented by the dotted lines in FIG. 5.

The converter 144A converts the first object information into second object information which represents a three-dimensional position of the drawing object arranged on a surface of the projection target PS, namely a three-dimensional position in the real space coordinate system, when the drawing object is arranged on the surface of the projection target PS. In a more detailed description, the converter 144A arranges a first object represented by the first object information on the front clipping plane indicated by F1 in FIG. 4 using the first position information DA1, the first posture information DB1, and the internal parameter matrix of the imaging lens. The converter 144A converts the first object information into the second object information by calculating a three-dimensional position representing an intersection point between the first object on the front clipping plane and an object existing on an extended line of a line connecting the first object on the front clipping plane and the principal point MP of the imaging lens. When the imaging lens has a distortion, the converter 144A converts the first object information into the second object information which does not include an influence of a lens distortion, namely the second object information representing the accurate three-dimensional position of the drawing object in the three-dimensional space, by arranging the first object, which is to be arranged on the front clipping plane, on a coordinate on which a so-called distortion correction process for correcting the distortion has been performed.

Figure 6:
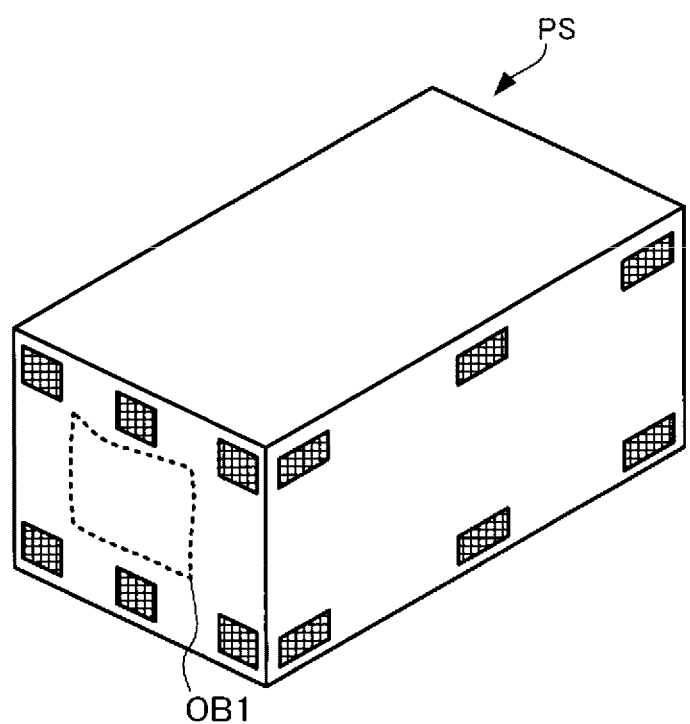
FIG. 6 is a diagram for explaining an operation example of the present embodiment.

The projection controller 145 converts the second object information into third object information representing a two-dimensional position of the drawing object on an image to be projected from the projector 20, namely a two-dimensional position in the projector coordinate system. In a more detailed description, the projection controller 145 substitutes the second position information DA2, the second posture information DB2, and the internal parameter matrix of the projection lens into the formula (1), and further substitutes coordinate values represented by the second object information into X, Y, and Z in the right-hand side of the formula (1) to thereby convert the second object information into the third object information. Then, the projection controller 145 generates image data representing the projection image including the drawing object based on the third object information, and then transmits the image data thus generated to the projector 20. Since it is possible to include the internal parameter representing the lens distortion in the formula (1), by converting the second object information into the third object information in accordance with the formula (1), the projection image coupled with the lens distortion of the projection lens is generated. By projecting the projection image on the projection target PS from the projector 20, the drawing object having the shape designated by that operation shows on the surface of the projection target PS at the position designated by the operation on the taken image G1 as shown in FIG. 6.

Figure 7:
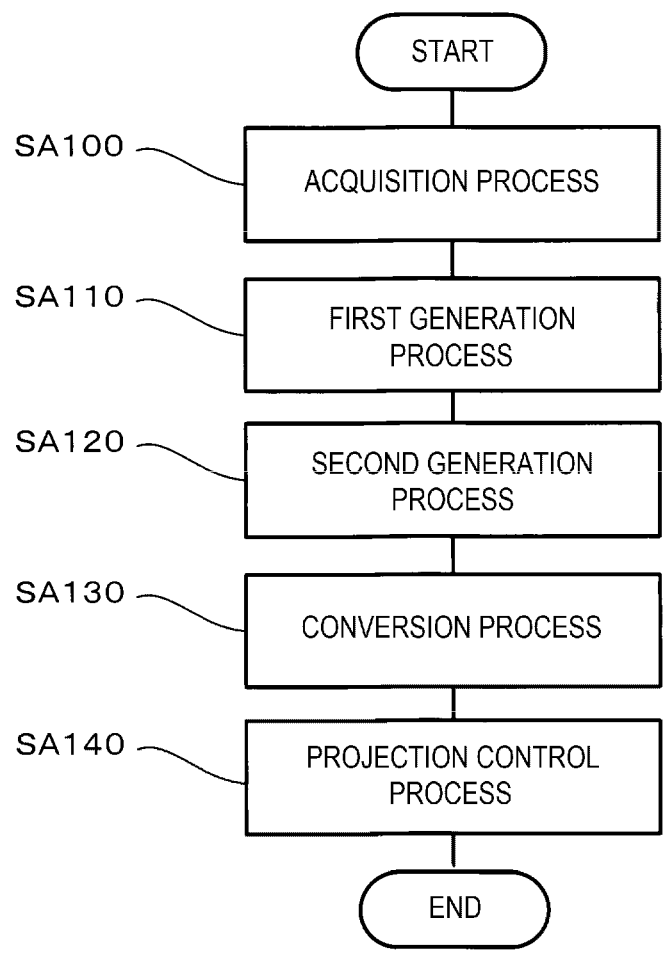
FIG. 7 is a flowchart showing a flow of a projection method to be executed by a processing device of the control device in accordance with a program.

Further, the processing device 140 which is operating in accordance with the program PA executes a projection method conspicuously representing features of the present embodiment. FIG. 7 is a flowchart showing a flow of this projection method. As shown in FIG. 7, the projection method includes an acquisition process SA100, a first generation process SA110, a second generation process SA120, a conversion process SA130, and a projection control process SA140. Contents of the acquisition process SA100, the first generation process SA110, the second generation process SA120, the conversion process SA130, and the projection control process SA140 are as follows.

In the acquisition process SA100, the processing device 140 functions as the acquisition section 141A. In the acquisition process SA100, the processing device 140 communicates with the camera 30 using the communication device 100 to thereby obtain the taken image data representing the taken image which is obtained by imaging the projection target PS with the camera 30.

In the first generation process SA110, the processing device 140 functions as the first generator 142A. In the first generation process SA110, the processing device 140 generates the first position information DA1 and the first posture information DB1 using the principle of PnP based on the taken image represented by the taken image data obtained in the acquisition process SA100 and the marker information DM. Further, the processing device 140 generates the second position information DA2 based on the first position information DA1 and the third position information DA3, and at the same time, generates the second posture information DB2 based on the first posture information DB1 and the third posture information DB3.

In the second generation process SA120, the processing device 140 functions as the second generator 143A. In the second generation process SA120, the processing device 140 makes the display device 110 display the image represented by the taken image data obtained in the acquisition process SA100 to thereby receive the operation of drawing the drawing object in the area occupied by the projection target PS in the taken image. Then, the processing device 140 receives that operation with the input device 120, and generates the first object information, which represents the two-dimensional position of the drawing object in the taken image, in accordance with the operation content data provided from the input device 120. As described above, when the drawing object OB1 is drawn as indicated by the dotted line in FIG. 5 to the taken image G1 displayed on the display device 110, the first object information representing the two-dimensional positions on the taken image of the respective points on the dotted line is generated in the second generation process SA120.

In the conversion process SA130, the processing device 140 functions as the converter 144A. In the conversion process SA130, the processing device 140 converts the first object information into the second object information based on the first position information DA1 and the first posture information DB1.

In the projection control process SA140, the processing device 140 functions as the projection controller 145. In the projection control process SA140, the processing device 140 converts the second object information into the third object information based on the second position information DA2 and the second posture information DB2. Then, the processing device 140 generates the image data representing the projection image including the drawing object OB1 based on the third object information, and then transmits the image data thus generated to the projector 20. By projecting the projection image on the projection target PS from the projector 20, the drawing object having the shape designated by that operation shows on the surface of the projection target PS at the three-dimensional position designated by the operation on the taken image G1 as shown in FIG. 6.

As described hereinabove, according to the present embodiment, it becomes possible to project the image of the drawing object, which is drawn by the user on the taken image of the projection target PS to be projected on the projection target PS, on the projection target PS with the accurate shape at the accurate three-dimensional position.

2. Second Embodiment

Figure 8:
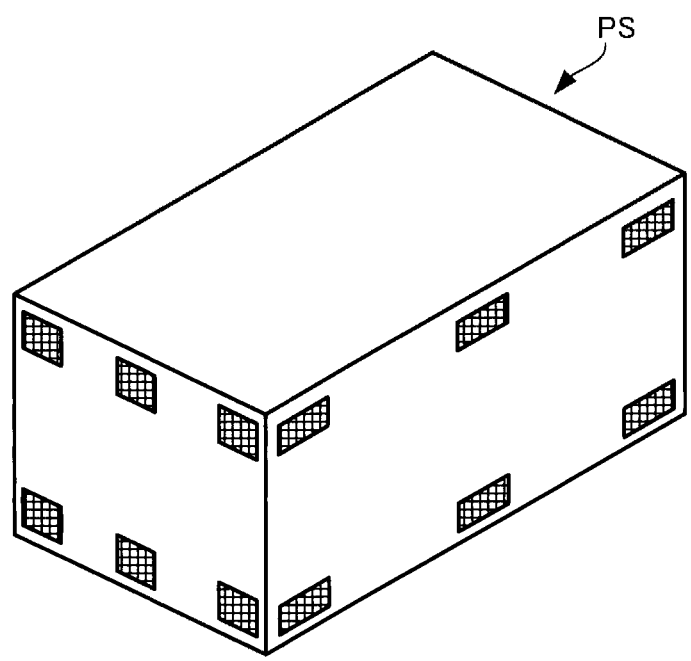
FIG. 8 is a diagram showing a configuration example of a projection system according to a second embodiment of the present disclosure.
Figure 8:
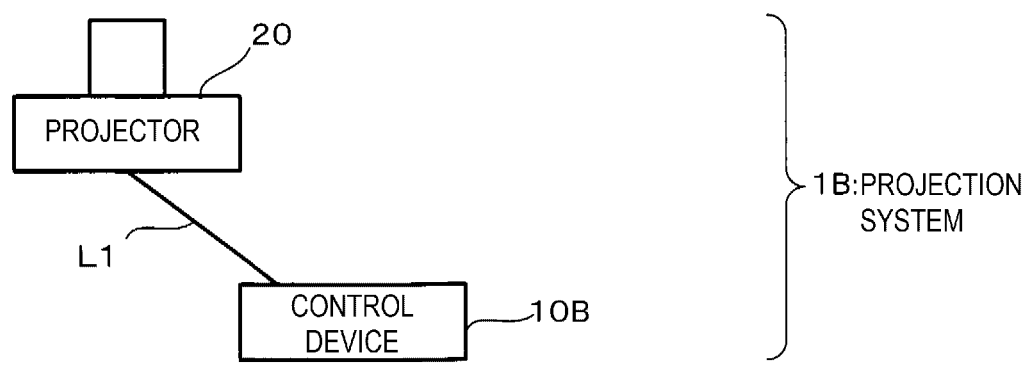
Figure 9:
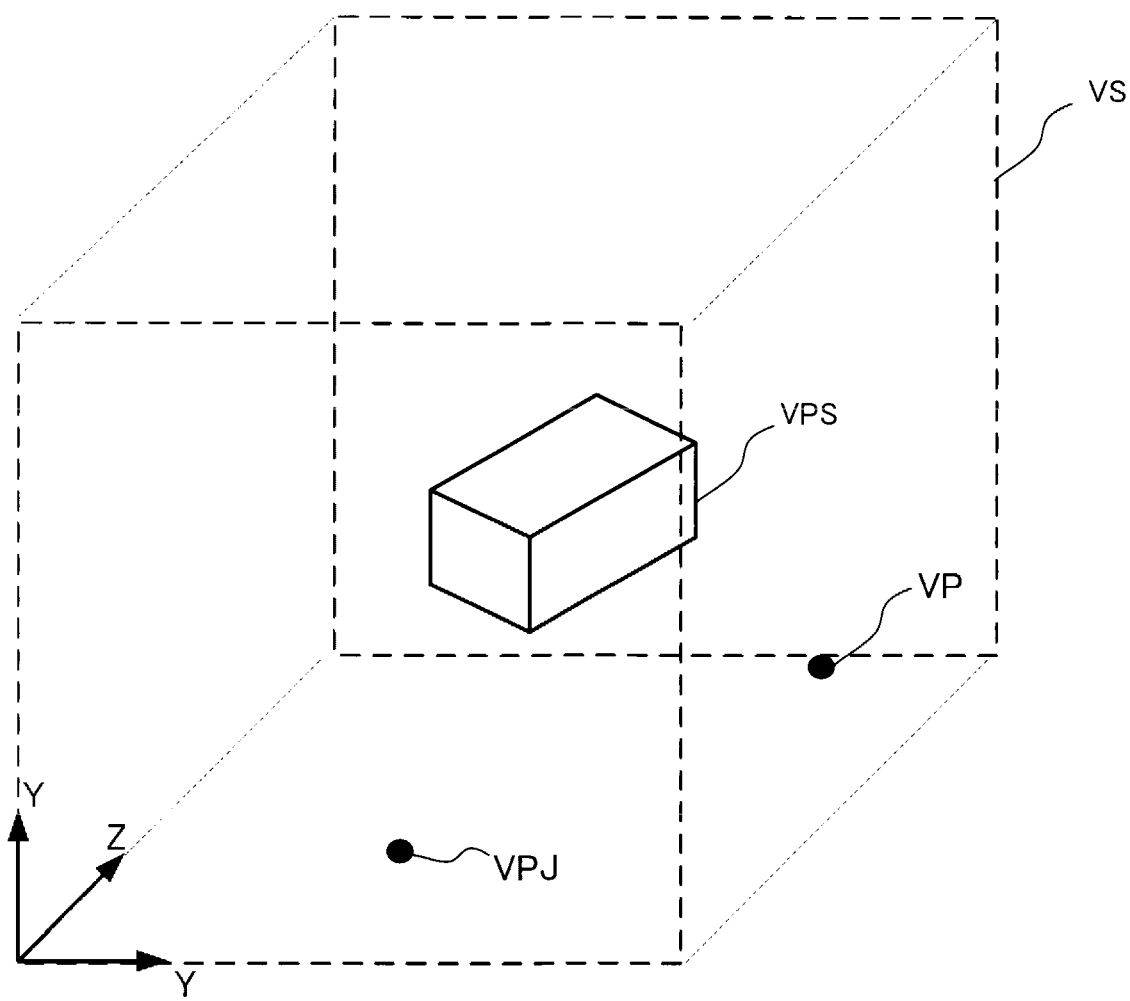
FIG. 9 is a diagram for explaining a virtual space in the present embodiment.

FIG. 8 is a diagram showing a configuration example of a projection system 1B according to a second embodiment of the present disclosure. As shown in FIG. 9, the present embodiment is different from the first embodiment in the point that the projection image is generated based on an image obtained by viewing a virtual object VPS simulating the projection target PS from a viewpoint VP set by the user in a virtual space VS including the virtual object VPS and a virtual projector VPJ simulating the projector 20. In this virtual space VS, there is set an arbitrary three-dimensional coordinate system. Further, the three-dimensional coordinate system set in the virtual space VS is called a virtual space coordinate system. In the present embodiment, a relative three-dimensional position between the virtual object VPS and the virtual projector VPJ in the virtual space coordinate system depends on the relative three-dimensional position between the projection target PS and the projector 20 in the real space coordinate system. Specifically, the relative three-dimensional position between the virtual object VPS and the virtual projector VPJ in the virtual space coordinate system is the same as the relative three-dimensional position between the projection target PS and the projector 20 in the real space coordinate system. In the present embodiment, the relative three-dimensional position between the projector 20 and the projection target PS in the real space coordinate system, and the orientation of the optical axis of the projector 20 are known. When a shape of the projection target PS is designed using CAD (Computer-Aided Design), the CAD space can be cited as a specific example of the virtual space VS.

Between FIG. 8 and FIG. 1, the same constituents are denoted by the same reference symbols. As is obvious when comparing FIG. 8 and FIG. 1 with each other, the projection system 1B is different from the projection system 1A in the point that the projection system 1B has a control device 10B instead of the control device 10A, and the point that the projection system 1B does not have the camera 30. In the present embodiment, since the projection image is generated based on the image obtained by viewing the virtual object VPS from the viewpoint VP set by the user in the virtual space VS, the camera 30 is unnecessary. Further, in the present embodiment, it is possible for the user to set the viewpoint VP at an arbitrary three-dimensional position.

Figure 10:
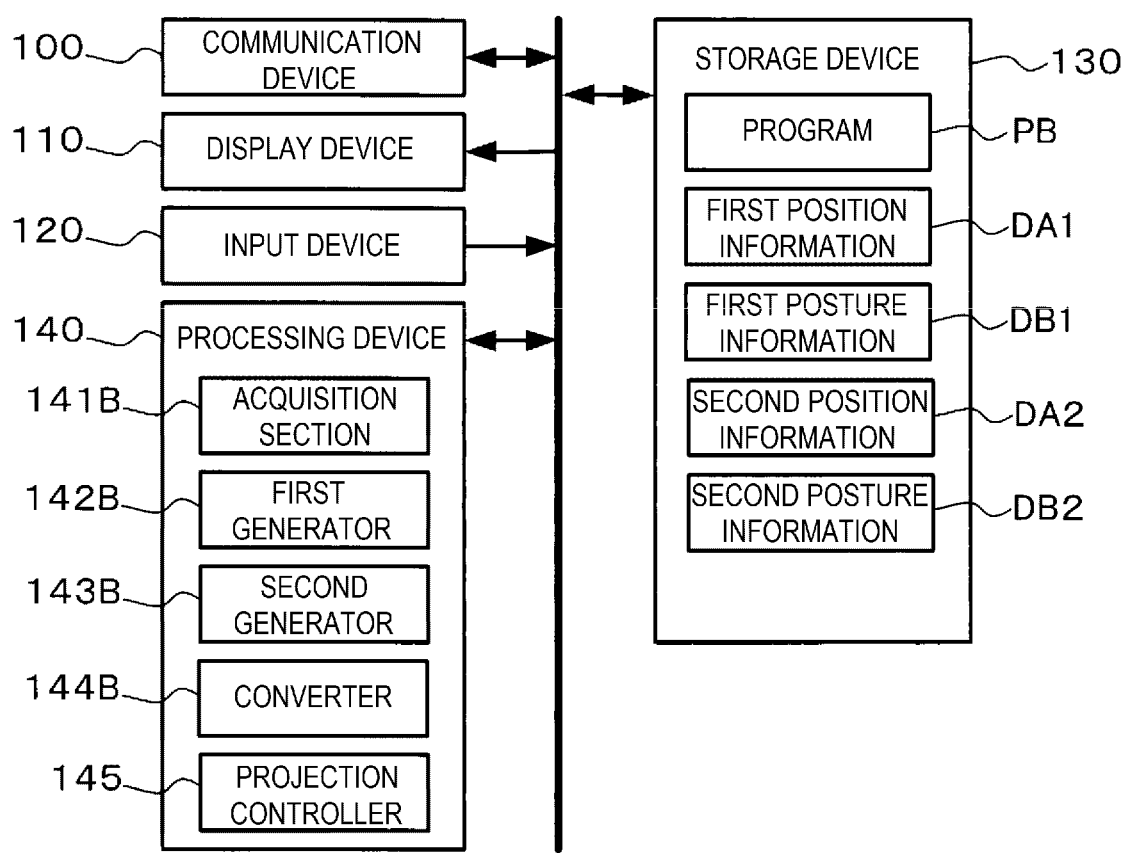
FIG. 10 is a diagram showing a configuration example of a control device included in the projection system.

FIG. 10 is a block diagram showing a configuration example of the control device 10B. In FIG. 10, the same constituents as those shown in FIG. 2 are denoted by the same reference symbols. In the present embodiment, the third position information DA3, the third posture information DB3, and the marker information DM are not stored in the storage device 130, and in this point, the present embodiment is different from the first embodiment. In the point that the first position information DA1 and the second position information DA2 are each a parallel translation matrix, the present embodiment is substantially the same as the first embodiment. Further, in the point that the first posture information DB1 and the second posture information DB2 are each a rotation matrix, the present embodiment is substantially the same as the first embodiment.

The present embodiment is different from the first embodiment in the point that the first position information DA1 represents a relative three-dimensional position between the viewpoint VP and the virtual object VPS in the virtual space VS, and the first posture information DB1 represents a direction in which the virtual object VPS is viewed from the viewpoint VP in the virtual space VS. Further, the present embodiment is different from the first embodiment in the point that the second position information DA2 represents a relative three-dimensional position between the virtual projector VPJ and the virtual object VPS, and the second posture information DB2 represents an orientation of the optical axis of the virtual projector VPJ. It should be noted that in the present embodiment, the relative three-dimensional position between the virtual projector VPJ and the virtual object VPS is the same as the relative three-dimensional position between the projector 20 and the projection target PS, and the orientation of the optical axis of the virtual projector VPJ is the same as the orientation of the optical axis of the projector 20. In the present embodiment, the relative three-dimensional position between the projector 20 and the projection target PS and the orientation of the optical axis of the projector 20 are known, and the second position information DA2 and the second posture information DB2 are stored in advance in the storage device 130 of the control device 10B. It should be noted that although the detailed illustration is omitted in FIG. 10, in the storage device 130 of the control device 10B, there is stored in advance virtual space information representing the virtual space coordinate system, and the three-dimensional position and the shape of the virtual object VPS in the virtual space VS.

As is obvious when comparing FIG. 10 and FIG. 2 with each other, in the present embodiment, a program PB is stored in the storage device 130 instead of the program PA. Similarly to the case in the first embodiment, the processing device 140 starts the execution of the program PB taking power-on of the control device 10B as a trigger. The processing device 140 which is currently operating in accordance with the program PB functions as an acquisition section 141B, a first generator 142B, a second generator 143B, a converter 144B, and a projection controller 145. The acquisition section 141B, the first generator 142B, the second generator 143B, the converter 144B, and the projection controller 145 are software modules which are realized by making the computer operate with the program PB.

The acquisition section 141B displays an image in the virtual space VS on the display device 110 to thereby receive an operation of setting a three-dimensional position of the viewpoint VP in the virtual space VS and the direction in which the virtual object VPS is viewed from the viewpoint VP. When these operations are performed on the input device 120, the acquisition section 141B calculates the image data representing a virtual taken image obtained by viewing the virtual object VPS from the viewpoint VP set by the user based on the virtual space information and information representing the three-dimensional position of the viewpoint VP in the virtual space VS to thereby obtain the image data representing the virtual taken image. This virtual taken image is an example of the first image in the present disclosure. The virtual taken image is not an image taken via the imaging lens, and therefore, does not include the lens distortion.

The first generator 142B generates the first position information DA1 and the first posture information DB1 based on the three-dimensional position of the viewpoint VP in the virtual space VS, a direction in which the virtual object VPS is viewed from the viewpoint VP, and the virtual space information.

The second generator 143B makes the display device 110 display an image represented by the taken image data obtained by the acquisition section 141B, namely the virtual taken image, to thereby receive an operation of drawing the drawing object in an area occupied by the virtual object VPS in the virtual taken image. Since the virtual taken image does not include the lens distortion as described above, according to the present embodiment, it becomes possible to draw the drawing object based on the image without the lens distortion. The second generator 143B receives the operation of drawing the drawing object with the input device 120, and generates the first object information, which represents the two-dimensional position of the drawing object in the virtual taken image, in accordance with the operation content data provided from the input device 120.

The converter 144B converts the first object information into the second object information representing the three-dimensional position of the drawing object arranged on a surface of the virtual object VPS, namely the position in the virtual space coordinate system, based on the first position information DA1 and the first posture information DB1.

The projection controller 145 converts the second object information into the third object information representing the two-dimensional position of the drawing object on the projection image to thereby project the projection image including the drawing object to the projection target from the projector 20 similarly to the case in the first embodiment.

Figure 11:
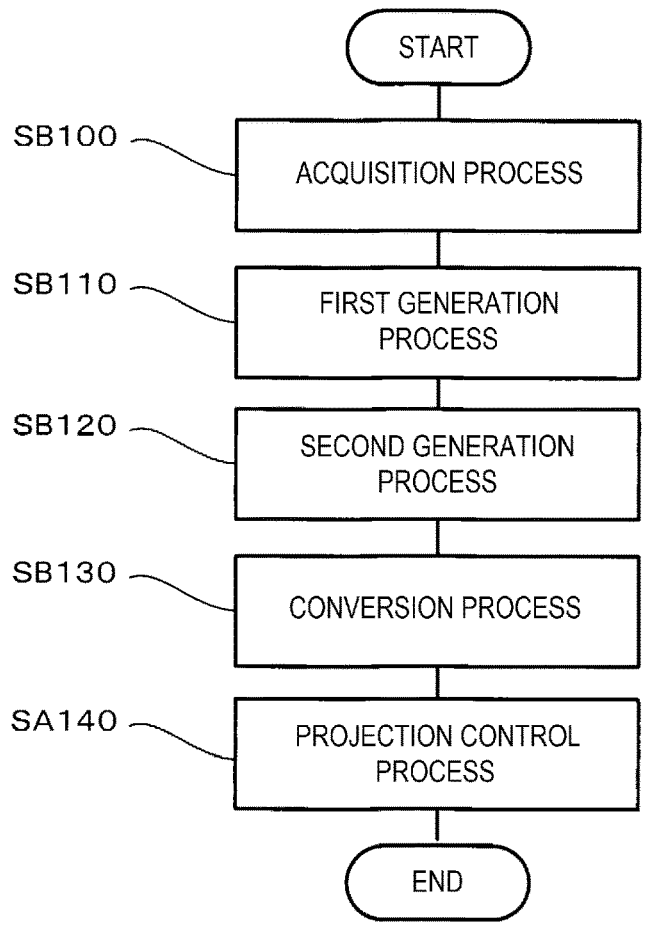
FIG. 11 is a flowchart showing a flow of a projection method to be executed by a processing device of the control device in accordance with a program.

Further, the processing device 140 which is operating in accordance with the program PB executes a projection method conspicuously representing features of the present embodiment. FIG. 11 is a flowchart showing a flow of this projection method. In FIG. 11, the same processing as one shown in FIG. 7 is denoted by the same reference symbol. As is obvious when comparing FIG. 11 and FIG. 7 with each other, the projection method in the present embodiment is different from the projection method in the first embodiment in the point that an acquisition process SB100 is included instead of the acquisition process SA100, the point that a first generation process SB110 is included instead of the first generation process SA110, the point that a second generation process SB120 is included instead of the second generation process SA120, and the point that a conversion process SB130 is included instead of the conversion process SA130.

In the acquisition process SB100, the processing device 140 functions as the acquisition section 141B. In the acquisition process SB100, the processing device 140 displays the image in the virtual space VS on the display device 110 to thereby receive the operation of setting the three-dimensional position of the viewpoint VP in the virtual space VS and the direction in which the virtual object VPS is viewed from the viewpoint VP. Then, the processing device 140 obtains the image data representing the virtual taken image by calculating the image data representing the virtual taken image obtained by viewing the virtual object VPS from the viewpoint VP set by the user based on the virtual space information and the information representing the three-dimensional position of the viewpoint VP in the virtual space VS and the direction in which the virtual object VPS is viewed from the viewpoint VP.

In the first generation process SB110, the processing device 140 functions as the first generator 142B. In the first generation process SB110, the processing device 140 generates the first position information DA1 and the first posture information DB1 based on the three-dimensional position of the viewpoint VP set by the user, the direction in which the virtual object VPS is viewed from the viewpoint VP, and the virtual space information.

In the second generation process SB120, the processing device 140 functions as the second generator 143B. In the second generation process SB120, the processing device 140 makes the display device 110 display the virtual taken image represented by the image data obtained in the acquisition process SB100 to thereby receive the operation of drawing the drawing object in the area occupied by the virtual object VPS in this virtual taken image. Then, the processing device 140 receives that operation with the input device 120, and generates the first object information, which represents the two-dimensional position of the drawing object in the virtual taken image, in accordance with the operation content data provided from the input device 120.

In the conversion process SB130, the processing device 140 functions as the converter 144B. In the conversion process SB130, the processing device 140 converts the first object information into the second object information based on the first position information DA1 and the first posture information DB1.

In the projection control process SA140, the processing device 140 functions as the projection controller 145. In the projection control process SA140, the processing device 140 converts the second object information into the third object information based on the second position information DA2 and the second posture information DB2. Then, the processing device 140 generates the image data representing the projection image including the drawing object based on the third object information, and then transmits the image data thus generated to the projector 20.

According also to the present embodiment, it becomes possible to project the image, which is drawn by the user on the virtual taken image to be projected on the projection target PS, on the projection target PS from the projector 20 with the accurate shape at the accurate three-dimensional position. It should be noted that in the present embodiment, the relative three-dimensional position between the projector 20 and the projection target PS and the orientation of the optical axis of the projector 20 are known, and the second position information DA2 and the second posture information DB2 are set in advance in the storage device 130. However, it is possible to receive the operation of setting the three-dimensional position and the posture of the virtual projector VPJ in the acquisition process SB100, and it is possible to generate the second position information DA2 and the second posture information DB2 in the first generation process SB110.

In addition, in the present embodiment, since it is possible to arbitrarily set the three-dimensional position of the viewpoint VP and the direction in which the virtual object VPS is viewed from the viewpoint VP, by setting the three-dimensional position of the viewpoint VP in the virtual space VS and the direction in which the virtual object VPS is viewed from the viewpoint VP so as to directly face a surface on which the drawing object is desired to be disposed out of the six surfaces of the projection target PS, the following advantages are exerted. It should be noted that directly facing the surface on which the drawing object is desired to be disposed means that a straight line passing through the viewpoint VP and the center of that surface perpendicular to that surface, and the direction in which the virtual object VPS is viewed from the viewpoint VP is parallel to that straight line.

Figure 12:
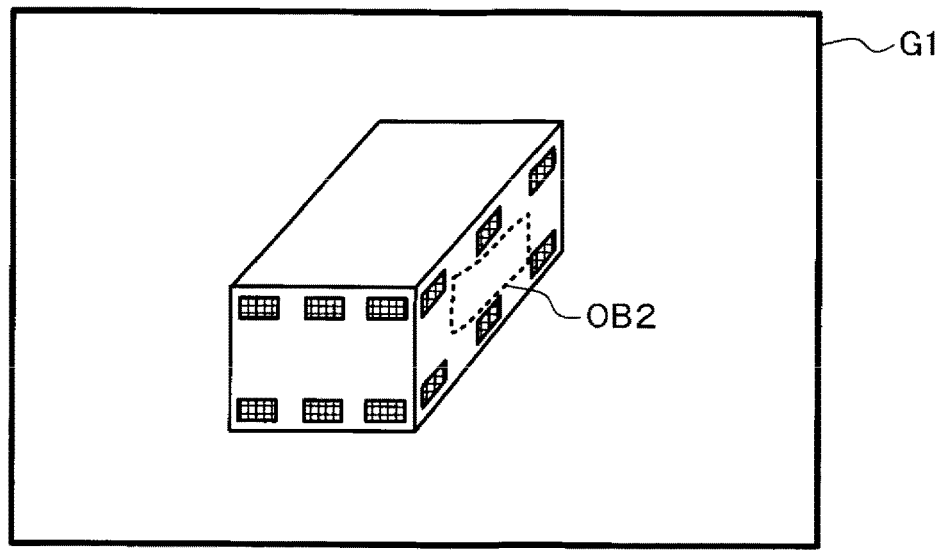
FIG. 12 is a diagram for explaining advantages of the present embodiment.
Figure 13:
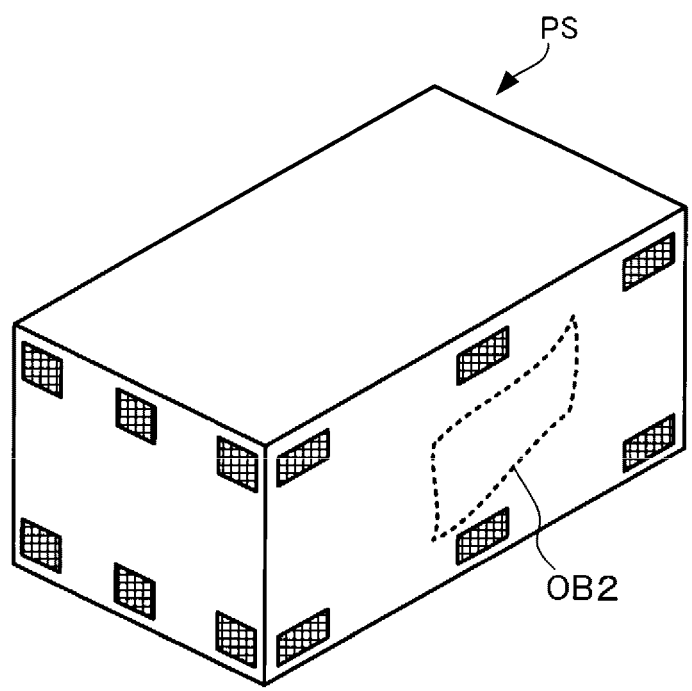
FIG. 13 is a diagram for explaining advantages of the present embodiment.

In the projection system 1A according to the first embodiment, when the drawing object is drawn to the taken image taken in the state in which the surface where the drawing object OB2 is arranged in the projection target PS and the optical axis of the camera 30 are not perpendicular to each other, namely the taken image which does not directly face the projection target PS as shown in FIG. 12, a projection distortion occurs in the drawing object OB2 showing on the surface of the projection target PS as shown in FIG. 13. In the present embodiment, by setting the three-dimensional position of the viewpoint VP and the direction in which the virtual object VPS is viewed from the viewpoint VP so as to directly face the surface on which the drawing object is desired to be disposed, the occurrence of the projection distortion is avoided. It should be noted that the setting of the three-dimensional position of the viewpoint VP can be limited to setting thereof to a position directly facing the virtual object VPS. The position directly facing the virtual object VPS means a position directly facing one of the plurality of surfaces constituting an exterior of the virtual object VPS. In the aspect in which the setting of the three-dimensional position of the viewpoint VP is limited to the setting thereof to the position directly facing the virtual object VPS, the first posture information DB1 can be omitted. This is because, in this aspect, it is possible to generate the second object information by projecting the drawing object drawn in the virtual taken image on the virtual object VPS while reducing the drawing object with a ratio corresponding to a distance between the viewpoint VP and the virtual object VPS and a distance from the front clipping plane to the viewpoint VP in the viewing frustum the tip of which is located at the viewpoint VP.

3. Modifications

The embodiments described above can be modified as follows.

(1) In the second embodiment described above, the drawing object, the three-dimensional position in the three-dimensional space of which is represented by the second object information, can be posted on the surface of the virtual object VPS as a texture. According to the present aspect, when the virtual object VPS moves in accordance with the movement of the projection target PS, it becomes possible to make the display device 110 display the virtual taken image of the virtual object VPS having the surface on which the drawing object has already been arranged without performing redrawing of the drawing object on the virtual taken image. Regarding the first embodiment, when similarly arranging that the virtual taken image is used instead of the taken image, it becomes possible to make the display device 110 display the virtual taken image of the virtual object VPS having the surface on which the drawing object has already been arranged without performing the redrawing of the drawing object when the projection target PS moves.

(2) In the first embodiment described above, the first position information DA1 and the first posture information DB1 are obtained using the plurality of markers M arranged on the surface of the projection target PS. However, it is possible for the input device 120 to receive an operation of selecting a plurality of characteristic points which are located on the surface of the projection target PS showing up in the taken image of the projection target PS, and the three-dimensional positions of which are known, and it is possible for the first position information DA1 and the first posture information DB1 to be obtained based on the two-dimensional positions on the taken image of the plurality of characteristic points. Further, it is possible to add the camera 30 to the projection system 1B according to the second embodiment, and it is possible to execute the first generation process SA110 in the control device 10B instead of the first generation process SB110. In this case, instead of the plurality of markers M, it is possible to use the plurality of characteristic points which are located on the surface of the projection target PS showing up in the taken image of the projection target PS, and the three-dimensional positions of which are known.

(3) It is possible for the communication device 100 to communicate with the projector 20 or the camera 30 via a communication network such as wireless LAN (Local Area Network) or wired LAN. As a specific example of the communication device 100 in the aspect of performing the communication with the projector 20 or the camera 30 via the wired LAN, there can be cited NIC (Network Interface Card) coupled to the wired LAN via a LAN cable. Further, as a specific example of the communication device 100 in the aspect of communicating with the projector 20 or the camera 30 via the wireless LAN, there can be cited an antenna for receiving a communication radio wave in the wireless LAN, and a circuit for performing modulation and demodulation of the communication radio wave. Further, it is possible for the communication device 100 to communicate with a manager terminal via the communication network, and it is possible for the manager terminal to carry the functions of the display device 110 and the input device 120. According to this aspect, by using annotation information for alerting the viewer of the projection image as the drawing object, real-time remote communication between the viewer and a manager in a remote location via the projection target PS becomes possible.

As a specific example of the remote communication, when the projection target PS is a product manufactured by manual works of a worker in a manufacturing line in a factory, there can be cited an operation in which the manager sequentially draws the drawing objects showing work places in the taken image or the virtual taken image of the projection target PS to thereby instruct a work procedure. Further, as another specific example of the remote communication described above, there can be cited an operation in which a topography diorama or the like in a public facility is used as the projection target PS, and the manager such as a curator sequentially draws the drawing objects showing attention places in the taken image or the virtual taken image of the projection target PS to thereby provide a commentary regarding the projection target PS to visitors of the public facility. Further, as still another specific example of the remote communication described above, there can be cited an operation in which a human phantom in healthcare education is used as the projection target PS, and the manager such as a preceptor sequentially draws the drawing objects showing attention places in the taken image or the virtual taken image of the projection target PS to thereby conduct training of a learner. As described above, according to the present disclosure, it becomes possible to conduct training of a person who does not have a specific knowledge or skill without a person having the knowledge or skill going down to the site.

(4) The number of the projectors 20 included in the projection system 1A is 1 in the first embodiment described above, but can also be 2 or more. For example, when the projection target PS is large compared to a range in which an image can be projected by the projector 20, it is possible to use a plurality of projectors 20 to assign projection areas different from each other to the respective projectors 20. Similarly, it is possible to include the plurality of projectors 20 in the projection system 1B. Further, it is possible to include a plurality of cameras 30 in the projection system 1A.

(5) It is possible for the control device 10A in the first embodiment described above to be manufactured or sold alone. By including a single projector 20 or a plurality of projectors 20, and a single camera 30 or a plurality of cameras 30, and adding the control device 10A to a related-art projection system for realizing the projection mapping, it becomes possible to execute the projection method according to the present disclosure in the related-art projection system. Similarly, it is possible for the control device 10B in the second embodiment to be manufactured or sold alone.

(6) In the first embodiment described above, the projector 20 for projecting the projection image on the projection target PS and the control device 10A for generating the image data representing the projection image are devices separated from each other, but the control device 10A can be included in the projector 20, or can be included in the camera 30. Similarly, regarding the control device 10B in the second embodiment, the control device 10B can be included in the projector 20. It should be noted that in the first embodiment described above, the acquisition section 141A, the first generator 142A, the second generator 143A, the converter 144A, and the projection controller 145 are the software modules, but can also be hardware modules such as an ASIC (Application Specific Integrated Circuit). In the second embodiment described above, the acquisition section 141B, the first generator 142B, the second generator 143B, the converter 144B, and the projection controller 145 can also be hardware modules such as an ASIC.

(7) The program PA in the first embodiment described above can be manufactured alone, or can be distributed with or without consideration. As a specific method of distributing the program PA, there is conceived an aspect of writing the program PA in a computer-readable recording medium such as a flash ROM (Read Only Memory) to distribute the recording medium, or an aspect of distributing the program PA by downloading the program PA via a telecommunication line such as the Internet. By making a general computer operate with the program PA distributed in these aspects, it is possible to make the computer function as the control device 10A. When using the computer as the control device 10A, at least one of a mouse and a keyboard can be used as the input device 120. Similarly, the program PB in the second embodiment described above can be manufactured alone, or can be distributed with or without consideration.

(8) In the first embodiment described above, when the projection target PS, the three-dimensional position and the orientation of the optical axis of the projector 20, and the three-dimensional position and the orientation of the optical axis of the camera 30 are fixed, the first position information DA1, the first posture information DB1, the second position information DA2, and the second posture information DB2 can be generated and then stored in the storage device 130 in advance. In this case, the first generator 142A is unnecessary, and the first generation process SA110 can also be omitted. Similarly, regarding the second embodiment, when the projection target PS, the three-dimensional position and the orientation of the optical axis of the projector 20, and the three-dimensional position of the viewpoint VP and the direction in which the virtual object VPS is viewed from the viewpoint VP are fixed, the first generator 142B is unnecessary, and the first generation process SB110 can also be omitted.

4. Aspects Figured Out From At Least One of Embodiments and Modified Examples

The present disclosure is not limited to the embodiments and the modified examples described above, but can be implemented in a variety of aspects within the scope or the spirit of the present disclosure. For example, the present disclosure can also be implemented in the following aspects. The technical features in the embodiments described above corresponding to the technical features in each of the aspects described below can arbitrarily be replaced or combined in order to solve apart or the whole of the problem of the present disclosure, or to achieve some or all of the advantages of the present disclosure. Further, the technical feature can arbitrarily be eliminated unless described in the present specification as an essential element.

An aspect of the projection method according to the present disclosure includes the acquisition process SA100, the second generation process SA120, the conversion process SA130, and the projection control process SA140 described below. The acquisition process SA100 is a process of obtaining the taken image obtained by taking an image of the projection target PS with the camera 30. The taken image obtained by taking the image of the projection target PS with the camera 30 is an example of the first image in the present disclosure. The second generation process SA120 is a process of generating the first object information representing the two-dimensional position of the drawing object in the taken image by receiving the operation of the user drawing the drawing object in the area occupied by the projection target PS in the taken image obtained in the acquisition process SA100. The conversion process SA130 is a process of converting the first object information into second object information which represents the three-dimensional position of the drawing object arranged on the surface of the projection target PS when the drawing object is arranged on the surface of the projection target PS. In the conversion process SA130, the first object information is converted into the second object information based on the first position information DA1 representing the relative three-dimensional position between the camera 30 and the projection target PS and the first posture information DB1 representing the orientation of the optical axis of the camera 30. The projection control process SA140 is a process of converting the second object information into the third object information representing the two-dimensional position of the drawing object on the image to be projected from the projector 20 to thereby project the projection image including the drawing object to the projection target PS from the projector 20. In the projection control process SA140, the second object information is converted into the third object information based on the second position information DA2 representing the relative three-dimensional position between the projector 20 and the projection target PS and the second posture information DB2 representing the orientation of the optical axis of the projector 20. According to the projection method in the present aspect, it becomes possible to project the image, which is drawn by the user on the taken image of the projection target PS, on the projection target PS from the projector 20 with the accurate shape at the accurate three-dimensional position.

The projection method in a more preferable aspect can further include the first generation process SA110 of generating the first position information DA1, the first posture information DB1, the second position information DA2, and the second posture information DB2. According to the present aspect, it becomes possible to arbitrarily set the relative three-dimensional position and the posture of the camera 30 with respect to the projection target PS, and the relative three-dimensional position and the posture of the projector 20 with respect to the projection target PS.

In the projection method according to the aspect including the first generation process SA110, the plurality of markers M the three-dimensional positions of which are known can be arranged on the surface of the projection target PS. In this aspect, it is possible for the first generation process SA110 to include a first process, a second process, and a third process described below. The first process is a process of generating the first position information DA1 and the first posture information DB1 based on the two-dimensional positions of the plurality of markers M in the taken image. The second process is a process of generating the second position information DA2 based on the third position information DA3 representing the relative three-dimensional position between the camera 30 and the projector 20, and the first position information DA1. The third process is a process of generating the second posture information DB2 based on the third posture information DB3 representing the relative posture between the camera 30 and the projector 20, and the first posture information DB1. According to the present aspect, it becomes possible to generate the first position information DA1, the first posture information DB1, the second position information DA2, and the second posture information DB2 based on the plurality of markers M arranged on the surface of the projection target PS.

In the projection method according to another of the aspect including the first generation process SA110, it is possible for the first generation process SA110 to include a fourth process, a fifth process, a sixth process, and a seventh process described below. The fourth process is a process of receiving the operation of selecting the plurality of characteristic points which are located on the surface of the projection target PS showing up in the taken image, and the three-dimensional positions of which are known. The fifth process is a process of generating the first position information DA1 and the first posture information DB1 based on the two-dimensional positions of the plurality of characteristic points in the taken image. The sixth process is a process of generating the second position information DA2 based on the third position information DA3 and the first position information DA1 representing the relative three-dimensional position between the camera 30 and the projector 20. The seventh process is a process of generating the second posture information DB2 based on the third posture information DB3 and the first posture information DB1 representing the relative posture between the camera 30 and the projector 20. According to the present aspect, it becomes possible to generate the first position information DA1, the first posture information DB1, the second position information DA2, and the second posture information DB2 based on the plurality of characteristic points located on the surface of the projection target PS.

Further, the projection method according to another aspect of the present disclosure includes the acquisition process SB100, the second generation process SB120, the conversion process SB130, and the projection control process SA140. The acquisition process SB100 is a process of obtaining the virtual taken image obtained by viewing the virtual object from a viewpoint set by the user in the virtual space which includes the virtual object simulating the projection target PS and the virtual projector simulating the projector 20 for projecting an image on the projection target PS, and in which the relative three-dimensional position between the virtual object and the virtual projector is decided in accordance with the relative three-dimensional position between the projection target PS and the projector 20. The virtual taken image is an example of the first image in the present disclosure. In the second generating process SB120, there is received an operation of the user drawing the drawing object in the area occupied by the virtual object in the virtual taken image. In the second generation process SB120, there is generated the first object information representing the two-dimensional position of the drawing object in the virtual taken image. In the conversion process SB130, the first object information is converted into the second object information based on the first position information DA1 representing the relative three-dimensional position between the viewpoint set by the user and the virtual object. The second object information in the present aspect represents the three-dimensional position of the drawing object arranged on the surface of the projection target when the drawing object is arranged on the surface of the virtual object. In the projection control process SA140, the second object information is converted into the third object information based on the second position information DA2 and the second posture information DB2. The second position information DA2 in the present aspect represents the relative three-dimensional position between the virtual projector and the virtual object. Further, the second posture information DB2 in the present aspect represents the orientation of the optical axis of the virtual projector. According also to the projection method in the present aspect, it becomes possible to project the image, which is drawn by the user on the virtual taken image, on the projection target PS from the projector 20 with the accurate shape at the accurate three-dimensional position.

The acquisition process SB100 in the projection method according to a more preferable aspect can further include receiving the operation of setting the three-dimensional position of the viewpoint. According to this aspect, it becomes possible to arbitrarily set the three-dimensional position of the viewpoint to obtain the virtual taken image.

In the projection method according to another preferable aspect, the viewpoint set in the virtual space is located at a three-dimensional position directly facing the virtual object. According to the present aspect, it becomes possible to make the user draw the drawing object to be projected on the projection target PS based on the virtual taken image directly facing the virtual object.

The projection method in the aspect in which the viewpoint set in the virtual space is located at the three-dimensional position directly facing the virtual object can further include the first generation process SB110 of generating the first position information DA1 and the second position information DA2. According to the present aspect, it becomes possible to arbitrarily set the relative three-dimensional position of the viewpoint with respect to the virtual object, and the relative three-dimensional position of the projector 20 with respect to the projection target PS.

In the projection method according to the aspect including the first generation process SB110, the plurality of markers M the three-dimensional positions of which are known can be arranged on the surface of the projection target. It is possible for the first generation process SB110 in the projection method according to this aspect to include an eighth process, a ninth process, and a tenth process. The eighth process is a process of obtaining the taken image obtained by imaging the projection target PS having a surface on which the plurality of markers M is arranged with the camera 30 disposed at the three-dimensional position corresponding to the viewpoint set in the virtual space. The ninth process is a process of generating the first position information DA1 based on the two-dimensional positions of the plurality of markers M in the taken image. The tenth process is a process of generating the second position information DA2 based on the third position information DA3 and the first position information DA1 representing the relative three-dimensional position between the camera 30 and the projector 20. It should be noted that the taken image described above is an example of the second image in the present disclosure.

Further, in the projection method according to another aspect including the first generation process SB110, it is possible for the first generation process SB110 to include an eleventh process, a twelfth process, a thirteenth process, and a fourteenth process described below. The eleventh process is a process of obtaining the taken image obtained by imaging the projection target PS with the camera 30 disposed at the three-dimensional position corresponding to the viewpoint set in the virtual space. The twelfth process is a process of receiving the operation of selecting the plurality of characteristic points which are located on the surface of the projection target PS showing up in the taken image, and the three-dimensional positions of which are known. The thirteenth process is a process of generating the first position information DA1 based on the two-dimensional positions of the plurality of characteristic points in the taken image described above. The fourteenth process is a process of generating the second position information DA2 based on the third position information DA3 and the first position information DA1 representing the relative three-dimensional position between the camera 30 and the projector 20. The taken image in the present aspect is also an example of the second image in the present disclosure.

Further, the projection system according to an aspect of the present disclosure includes the projector 20 for projecting an image on the projection target PS, the input device 120 for receiving the operation of the user, and the processing device 140. The processing device 140 executes the acquisition process SA100, the second generation process SA120, the conversion process SA130, and the projection control process SA140 described above. According also to the projection system in the present aspect, it becomes possible to project the image, which is drawn by the user on the taken image of the projection target PS by the camera 30, on the projection target PS from the projector 20 with the accurate shape at the accurate three-dimensional position.

Further, in the projection system according to another aspect including the projector 20, the input device 120, and the processing device 140, it is possible for the processing device 140 to execute the acquisition process SB100, the second generation process SB120, the conversion process SB130, and the projection control process SA140 described above. According also to the projection method in the present aspect, it becomes possible to project the image, which is drawn by the user on the virtual taken image, on the projection target PS from the projector 20 with the accurate shape at the accurate three-dimensional position.

What is claimed is:

1. A projection method comprising:
   obtaining a first image obtained by viewing a virtual object from a viewpoint set by a user in a virtual space which includes the virtual object simulating a projection target and a virtual projector simulating a projector configured to project an image on the projection target, and in which a relative three-dimensional position between the virtual object and the virtual projector is decided in accordance with a relative three-dimensional position between the projection target and the projector;
   receiving an operation of the user drawing a drawing object in the first image;
   generating first object information representing a two-dimensional position of the drawing object in the first image;
   converting the first object information into second object information representing a three-dimensional position of the drawing object arranged on a surface of the projection target when the drawing object is arranged on a surface of the virtual object, based on first position information representing a relative three-dimensional position between the viewpoint and the virtual object;
   converting the second object information into third object information representing a two-dimensional position of the drawing object on an image to be projected from the virtual projector based on second position information representing a relative three-dimensional position between the virtual projector and the virtual object and posture information representing an orientation of an optical axis of the virtual projector; and
   projecting a projection image including the drawing object on the projection target from the projector.

2. The projection method according to claim 1, further comprising:
   receiving an operation of setting a three-dimensional position of the viewpoint.

3. The projection method according to claim 1, wherein the viewpoint is located at a three-dimensional position facing the virtual object.

4. The projection method according to claim 1, further comprising:
   generating the first position information and the second position information.

5. The projection method according to claim 4, wherein
   a plurality of markers three-dimensional positions of which are known is arranged on the surface of the projection target, and
   the generating the first position information and the second position information includes
      obtaining a second image obtained by imaging the projection target having the surface on which the plurality of markers is arranged with a camera disposed at a three-dimensional position corresponding to the viewpoint,
      generating the first position information based on two-dimensional positions of the plurality of markers in the second image, and generating the second position information based on third position information representing a relative three-dimensional position between the camera and the projector, and the first position information.

6. The projection method according to claim 4, wherein the generating the first position information and the second position information includes
- obtaining a second image obtained by imaging the projection target with a camera disposed at a three-dimensional position corresponding to the viewpoint,
- receiving an operation of selecting a plurality of characteristic points which are located on the surface of the projection target in the second image, and three-dimensional positions of which are known,
- generating the first position information based on two-dimensional positions of the plurality of characteristic points in the second image, and
- generating the second position information based on third position information representing a relative three-dimensional position between the camera and the projector, and the first position information.

\* \* \* \* \*